United States Patent [19]
Denenberg

[11] Patent Number: 5,546,467
[45] Date of Patent: Aug. 13, 1996

[54] ACTIVE NOISE ATTENUATED DSP UNIT

[75] Inventor: Jeffrey N. Denenberg, Trumbull, Conn.

[73] Assignee: Noise Cancellation Technologies, Inc., Linthicum, Md.

[21] Appl. No.: 212,580

[22] Filed: Mar. 14, 1994

[51] Int. Cl.[6] .............................. A61F 11/06; H03B 29/00
[52] U.S. Cl. ..................... 381/71; 381/94; 340/310.01; 340/310.03; 340/310.06
[58] Field of Search ............................. 381/71, 94, 73.1; 340/310.01, 310.02, 310.06, 310.04; 379/66, 442, 444

[56] References Cited

U.S. PATENT DOCUMENTS

| | | | |
|---|---|---|---|
| 3,876,984 | 4/1975 | Chertok | 340/310.02 |
| 4,200,862 | 4/1980 | Campbell et al. | 346/310.01 |
| 4,418,333 | 11/1983 | Schwarzbach et al. | 340/310.01 |
| 4,988,972 | 1/1991 | Takagi | 340/310.06 |
| 5,018,202 | 5/1991 | Takahashi et al. | 381/71 |
| 5,051,720 | 9/1991 | Kittirutsunetorn | 340/310.02 |
| 5,066,939 | 11/1991 | Mansfield, Jr. | 379/66 |
| 5,105,377 | 4/1992 | Ziegler, Jr. | |
| 5,129,003 | 7/1992 | Saruta | 381/71 |
| 5,375,174 | 12/1994 | Denenberg | 381/71 |

OTHER PUBLICATIONS

M. S. Roden, "Digital Communication Systems Designs," Sections 5.6–5.9, 12.1 (1988).

*Primary Examiner*—Forester W. Isen
*Assistant Examiner*—Xu Mei
*Attorney, Agent, or Firm*—James W. Hiney

[57] ABSTRACT

An active noise control system for controlling multiple home appliances and including a power distribution network by which many appliances can be quieted by remotely processing noise signal information and forwarding noise cancelling signals to the appliances through the distribution network.

8 Claims, 3 Drawing Sheets

FIG.1
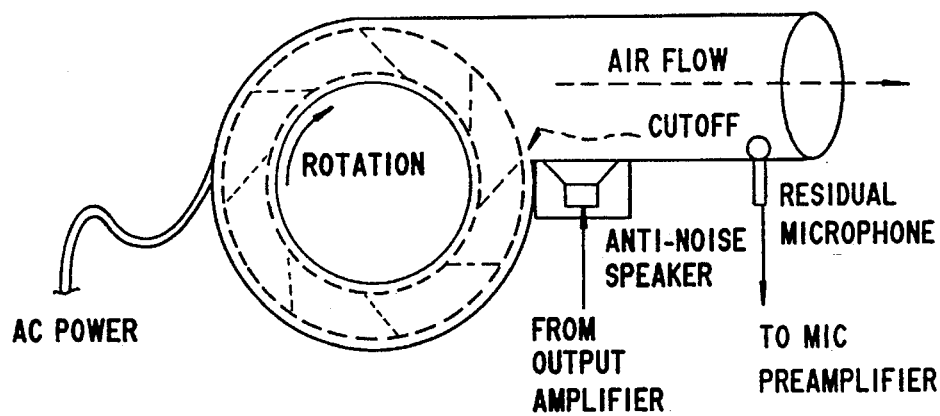
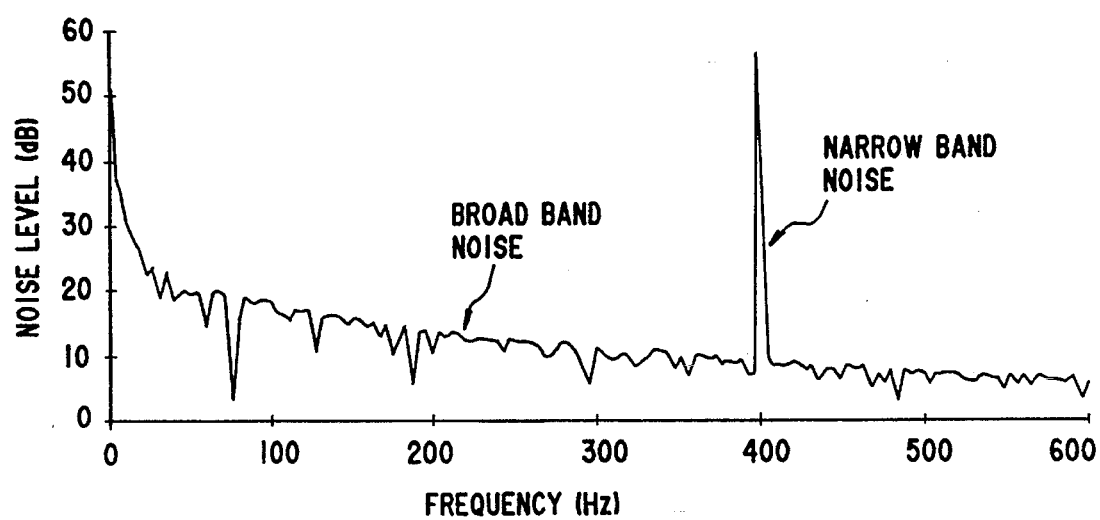
FIG.2

ACTIVE NOISE ATTENUATED DSP UNIT

This invention relates to an active noise DSP unit. Some anti-noise applications have weight and size constraints that limit ones ability to package a DSP based active noise control unit with the noise making appliance. This can be solved in applications involving an AC power source by packaging the controller at the AC power source and connecting to the anti-noise actuators in the appliance via signals sent and received over the AC power line. This technique also allows the sharing of a single controller with several appliances of the same class that have a common source of AC power.

The invention also provides for bandwidth limitations in the communication links over the AC power line and indicates a top-level system design for a remote noise canceling system for a hand held AC powered appliance. The example application used for this disclosure is a hand held blower that exhibits low frequency tonal noise.

GENERAL DESCRIPTION

The essence of this invention lies in enabling a more convenient packaging through the use of a standard communication scheme that passes the residual and anti-noise signals along the same wires used to provide power to the hand held appliance. The following section describes each of the subsystems at both ends of the power line.

BACKGROUND ART

Many systems using the AC power line as a communication pathway have been available at reasonable cost for several years. They use both analog and digital communication techniques. They are not compatible with each other and their reach includes all of the power circuits that are derived from a single distribution transformer. This means that several homes on the same street may have conflicting systems.

One popular system is the X10 system by BSR that is used to provide low speed digital communications in the home for various applications including:

Lighting Control

Small units are either installed in electrical boxes or plugged into outlets that respond to signals from controllers that are also plugged into outlets around the house. Electrical appliances or lights can then be turned on and off or dimmed from any of the controller locations. A variety of controllers are available including timer units that can automate a sequence of operations, computer peripheral boards to allow control by user provided software, and remote RF linked controllers to allow portability.

Alarm Systems

The X10 system can also be used to collect data from remote sensors. this is done in the "Wireless" alarm systems supplied by several manufacturers where sensors report a change of state via the AC power line to a central controller that then activates alarms or telephone dialers (which in turn can be remoted from the controller over the AC power line).

Another system that uses the AC power line in a home for communications takes the form of a remote music system. Here a unit is connected to the speaker terminals of a music source and plugged into the AC power line. The music is modulated (usually using Frequency Modulation techniques) onto a carrier that is higher than 20 kHz. This signal then propagates throughout the house so that one or more remote speakers can be lugged into any outlet in the house, receive both power and the modulated carrier, demodulate and amplify the music for use at that location.

A system like that just described for remote speakers but with two carriers at different frequencies, one to transmit the remote extension telephone mouthpiece signal to the host telephone location and the other to allow full duplex operation so that the ear signal can simultaneously be sent from the host telephone location to the remote extension.

Digital communication techniques are also currently in use to provide wireless Local Area Network (LAN) connections for personal computers. An example is the "BestLAN" system from Black Box Corporation which provides a 2 Mbit/second bi-directional communication path between a set of personal computers using the EtherNet Protocols (also known as CSMA/CA—Carrier Sense Multiple Access/Collision Avoidance).

Invention Overview

This section describes primary system requirements for allowing proper operation of an active noise cancellation system that uses communication channels to send the antinoise to the appliance and return residual signals to the controller. It also describes the use of an analog communication system to convey the required signals between the appliance and the controller over the AC power line used to provide power for the appliance.

A. System Requirements

Some basic system requirements are:

(1) Bandwidth

The power line is a bandwidth limited facility. The number of communication channels required is one in each direction for one appliance. Each channel has a sufficient bandwidth to pass the noise to be canceled (about 1 kHz in the example application). This is well within the state of the art for wireless data communication systems via the power distribution system of a home and is easily done on a dedicated power line to the appliance.

(2) Signal to Noise

The communication channels have sufficient S/N to allow the use of 12 or 16 bit A/D and D/A converters without significant degradation. This is an S/N of 72 to 90 dB.

B. Modulation and Multiplexing Techniques (background information)

(1) Frequency Modulation (FM)

reference *Digital Communication System Design*, M. S. Roden, Prentiss Hall, 1988

This is the classical system used in FM Broadcast radio today. A separate carrier frequency is chosen for each channel (this can be a sub-carrier on an optical channel) and the frequency of each carrier is modulated (varied) proportionally to that channel's information signal. A frequency detector is used to recover the information content for each channel.

The carriers are placed far enough apart in frequency so that simple filters can isolate them from the other channels. This along with the FM capture effect minimizes crosstalk.

(2) Packet Transfer

The CSMA/CA (EtherNet) system is in common usage for computer Local Area Networks (LAN). Each data element is packaged in a "Packet" that contains a header with address information, the information element (a chunk of information, e.g., a 12 bit sample) and a trailer that contains redundant information for error detection. Such a system is quite flexible.

(3) Pulse Code Modulation (PCM), Time Division Multiplexing (TDM) and Time Division Multiple Access (TDMA)

This system defines a multi-channel "Frame" in which a time slot is dedicated to each channel. The frames are transmitted at the sample rate (e.g., 10 kHz) and a sample from each channel is serially transmitted in its time slot. Additional time slots are dedicated to administrative functions such as:

(a) Bit and Frame Synchronization

The transmitter and receiver operate at the same speed and agree on time slot assignments.

(b) Error Detection

Parity bits are sent as additional bits per channel or a Cyclic Redundancy Check (CRC) word is included in a separate time slot as a check across time slots in each frame.

The reference work (Roden, 1988) describes a similar technique, the 24 channel Telecommunications PCM system called T1 as used in the United States, in Section 5.6. The European equivalent (CEPT) system is a 32 channel system that dedicates channel 0 to synchronization and channel 16 to other administrative functions. The CEPT system operates at 2.048 Mbit/Sec whereas the T1 system operates at 1.544 Mbit/Sec.

These systems are used to provide multiple access for additional appliances. The resulting Time Division Multiple Access (TDMA) system is introduced in Section 5.7 of the reference (Roden, 1988).

(4) Spread Spectrum and Code Division Multiple Access (CDMA)

This method has advantages when dealing with multiple interacting entities. it involves selecting a set of "orthogonal" signals (when multiplied together and averaged over the period of orthogonality the result is zero) and using each one to define an independent communication channel (Chapter 12 of Roden, 1988).

The resulting Code Division Multiple Access (CDMA) system is robust and can serve a reasonable number of independent communication channels. It has the drawback of delaying each signal by a time equal to the period of orthogonality and therefore will introduce significant communication delay that reduces the adaptation rate in tonal applications and eliminates the use of this approach in applications involving broadband noise.

Accordingly, it is an object of this invention to provide an active noise controller that communicates with the appliance being quieted by the appliance power connection.

A further object of this invention is to provide an active noise controller capable of controlling several appliances simultaneously.

Yet another object of this invention is to provide an analog communications system between a hand held appliance and an active noise controller adapted to quiet said appliance.

These and other objects will become apparent when reference is had to the following drawings in which:

FIG. 1 shows an appliance to be quieted,

FIG. 2 is a plot of the noise generated by the blower of FIG. 1,

Figure 3:
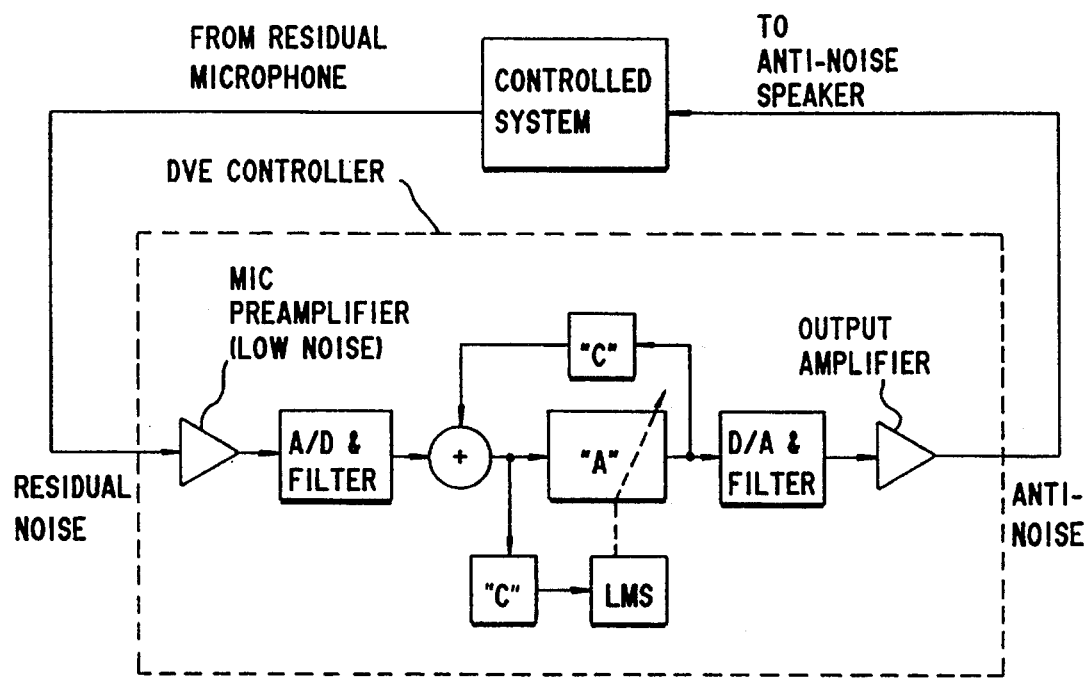
Figure 4:
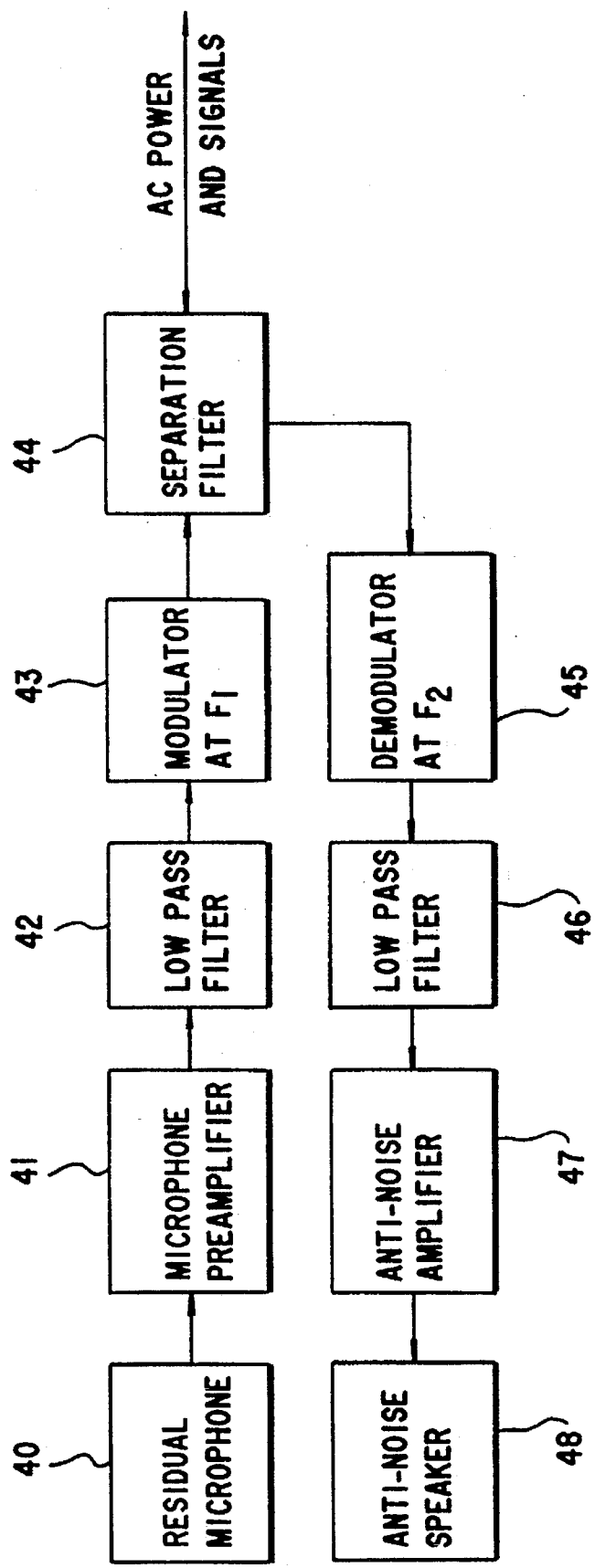

FIG. 3 is an anti-noise controller disclosed in U.S. Pat. No. 5,105,377,

FIG. 4 is a system diagram of the blower subsystems, and

Figure 5:
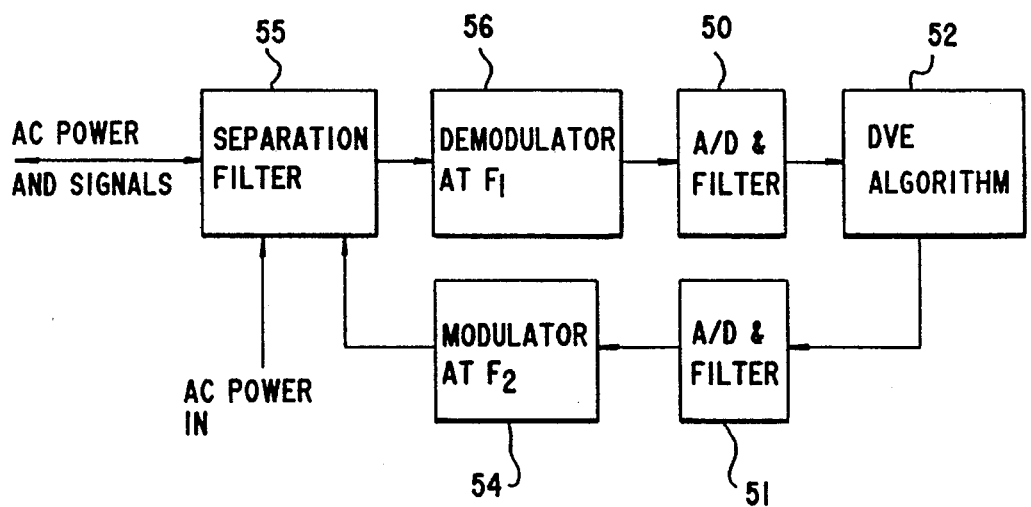

FIG. 5 is a system diagram of the controller subsystems.

Example Application

The application used here to exemplify the invention is a hand held, AC powered blower. FIG. 1 shows such a blower and the anti-noise sensors and actuators required to quiet the appliance.

This is a centrifugal blower. The noise generated by a blower of this class tends to look like that in FIG. 2. It has low frequency broadband noise and a narrow band or tonal component at the rate (typically about 400 Hz) at which the blades of the impeller pass the cutoff of the blower housing. The A-weighted noise measurement as well as the perceived disturbing nature of the noise is dominated by the component at the blade passage rate.

Therefore using active noise cancellation to reduce the tonal component is a significant improvement in the product. FIG. 3 shows an anti-noise controller based on the Digital Virtual Earth (DVE) technique, U.S. Pat. No. 5,105,377, herein incorporated by reference, which is the system used for canceling the blade passage tone in this instant application.

One problem in this application is the constraint on size and weight which can make it difficult to package the signal processing electronics in the blower housing.

FIG. 4 shows the blower subsystems and the components therein which are closely associated with the transducers plus the modulation and separation elements to allow the use of the AC power line as a bi-directional communications path.

The residual microphone 40 picks up the remaining noise after cancellation and provides the electrical signal to allow the algorithm in the controller to constantly adjust the generated anti-noise for quietest operation. The microphone is connected to the microphone preamplifier 41, a low noise amplifier adapted to produce a strong enough signal from the weak signal produced by the residual microphone 40. The low pass filters 42 make certain that only the desired signals pass to the Modulator 43 or from the Demodulator 45. The modulator 43 varies a parameter (the frequency for FM) of the carrier ($F_1$) proportionally with the residual signal which goes to the separation filter 44 which has three filter elements:

(i) a low pass/high pass filter that passes the AC power to the blower motor, (ii) the power supply for the blower electronics, and (iii) two band pass filters, each centered on one of the carrier frequencies.

The demodulator 45 receives the modulated (at $F_2$) anti-noise signal from the separation filter and reproduces the anti-noise that was generated in the controller. The anti-noise amplifier 47 produces enough anti-noise to match the noise power and the anti-noise speaker 48 generates the anti-noise and projects it into the blower outlet so that it couples accurately with the noise and allows quiet operation.

Packaged in the controller are the Digital Signal Processing elements plus the modulation and separation elements to allow the use of the AC power line as a bi-directional communication path. These subsystems are shown in FIG. 5.

An analog to digital (A/D) converter 50 converts the Residual Noise signal into a sequence of digital samples at a rate that is 4 to 6 times higher than the highest frequency to be processed. The signal should be filtered first to avoid aliasing, the confusion of high frequency information with low frequency information that can result from the sampling process.

A digital to analog converter 51 creates the anti-noise signal from a sequence of digital samples generated by the DVE algorithm 52. The output must be filtered to remove high frequency repetitions that exist in the digital domain and would produce audible noise in the appliance. The filters make certain that the signals passed to the A/D or from the D/A contain only frequencies that are below the Nyquist rate (½ the sampling rate). The modulator 54 varies a parameter (the frequency for FM) of the carrier ($F_2$) proportionally with the anti-noise signal. The separation filter 55 has three filter elements:

(i) a low pass/high pass filter that passes the AC power to the blower motor,
(ii) the power supply for the blower electronics, and
(iii) two band pass filters, each centered on one of the carrier frequencies.

The demodulator 56 receives the modulated (at $F_1$) residual noise signal from the separation filter and passes it to the A/D converter.

Having described the invention it will be obvious to those of ordinary skill in the art that changes and modifications can be made without departing from the scope of the appended claims.

I claim:

1. An active control system adapted to provide control to at least one house appliance to be quieted through the power connection, said system comprising an active noise control means associated with a power distribution network, at least one appliance means to be quieted, and a power connection means comprising a dual frequency modulation means between said control means and said appliance means adapted to convey noise control signals from said control means to said appliance means and a residual noise signal from said appliance back to said control means.

2. An active noise control system as in claim 1 wherein said power connection means includes a power cord with wire means to carry said signals.

3. An active noise control system as in claim 1 wherein the appliances are telephones.

4. An active noise control system as in claim 1 wherein said appliance means comprises a sub-circuit adapted to provide a signal representing the result of merging the noise signal to be attenuated with the anti-noise signal.

5. An active noise control system as in claim 4 wherein said sub-circuit includes a residual microphone, separation filter means, a demodulator means, an anti-noise amplifier and an anti-noise speaker.

6. An active noise control system as in claim 5 also including a microphone preamplifier means, low pass filter means and a modulator means.

7. An active noise control system as in claim 1 wherein said active noise control means includes an analog to digital conversion means, a digital to analog conversion means and a separation filter means.

8. An active noise control system as in claim 7 and wherein said active noise control means additionally includes filter means, modulator means and demodulator means.

* * * * *